(12) United States Patent
Ito et al.

(10) Patent No.: US 8,130,270 B2
(45) Date of Patent: Mar. 6, 2012

(54) VEHICLE-MOUNTED IMAGE CAPTURING APPARATUS

(75) Inventors: Haruo Ito, Tokyo (JP); Koichi Abe, Iwaki (JP); Hisatoshi Ishii, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 819 days.

(21) Appl. No.: 12/247,717

(22) Filed: Oct. 8, 2008

(65) Prior Publication Data

US 2009/0102921 A1    Apr. 23, 2009

(30) Foreign Application Priority Data

Oct. 23, 2007  (JP) ................................. 2007-275466

(51) Int. Cl.
*H04N 7/18* (2006.01)
*H04N 7/00* (2011.01)

(52) U.S. Cl. ........................................ 348/148; 348/118

(58) Field of Classification Search .................. 348/118, 348/148
See application file for complete search history.

(56) References Cited

U.S. PATENT DOCUMENTS

| | | | |
|---|---|---|---|
| 7,161,616 B1 * | 1/2007 | Okamoto et al. | 348/148 |
| 7,277,123 B1 | 10/2007 | Okamoto et al. | |
| 2002/0110262 A1 * | 8/2002 | Iida et al. | 382/104 |
| 2005/0168330 A1 | 8/2005 | Ono et al. | |
| 2006/0149429 A1 | 7/2006 | Aizawa | |
| 2007/0046450 A1 * | 3/2007 | Iwama | 340/436 |
| 2007/0239357 A1 * | 10/2007 | Mori et al. | 701/213 |
| 2009/0102921 A1 | 4/2009 | Ito et al. | |

FOREIGN PATENT DOCUMENTS

| | | |
|---|---|---|
| JP | 03099952 | 4/1991 |
| JP | 08305999 | 11/1996 |
| JP | 3300334 | 4/2002 |
| WO | WO 0064175 | * 10/2000 |

OTHER PUBLICATIONS

U.S. Appl. No. 12/247,735, filed Oct. 8, 2008, Haruo Ito et al.
Office Action dated Nov. 3, 2011 for U.S. Appl. No. 12/247,735, 22 pgs.
Interview Agenda dated Nov. 23, 2011 for U.S. Appl. No. 12/247,735, 5 pgs.
Interview Summary dated Dec. 1, 2011 U.S. Appl. No. 12/247,735, 3 pgs.

* cited by examiner

*Primary Examiner* — Karen Tang
*Assistant Examiner* — John Isom
(74) *Attorney, Agent, or Firm* — Brinks Hofer Gilson & Lione (57) ABSTRACT

Images captured by multiple cameras installed on a vehicle are combined, and an image of the ground is projected onto a plane and is displayed around a vehicle display portion. In the vehicle display portion, actual images of portions of the vehicle may be displayed in a front area, a rear area, a left-side area, and/or a right-side area. A vehicle illustration image is displayed in the area surrounded by the actual images of the portions of the vehicle. Since the vehicle actual images are displayed at the perimeter of the vehicle display portion, it is easy for an operator who views a display screen to recognize the positional relationships between the perimeter of the vehicle and obstacles outside the vehicle perimeter.

20 Claims, 9 Drawing Sheets

VEHICLE-MOUNTED IMAGE CAPTURING APPARATUS

RELATED APPLICATIONS

The present application claims priority to Japanese Patent Application Number 2007-275466, filed Oct. 23, 2007, the entirety of which is hereby incorporated by reference.

BACKGROUND OF THE INVENTION

1. Field of the Invention

The present invention relates to a vehicle-mounted image capturing apparatus that has multiple cameras installed on a vehicle to capture images, combines the images, and displays the resulting image. In particular, the present invention relates to a vehicle-mounted image capturing apparatus that facilitates viewing a border portion between the vehicle and its outside area.

2. Description of the Related Art

Japanese Unexamined Patent Application Publication Nos. 3-99952 and 8-305999 disclose vehicle-mounted image capturing apparatuses each having multiple cameras installed on a vehicle. Each of the cameras installed on the vehicle has a lens, such as a fisheye lens, that focuses light of an image of a wide-angle space area, and is adapted to allow the image focused thereby to be detected by a photodetector device, such as a CCD.

The vehicle-mounted image capturing apparatuses combine the images of areas outside the vehicle, the images being captured by the multiple cameras, so as to provide a projection image as viewed from above the vehicle and displays the projected combined image in combination with an image illustrating the vehicle. Such a display makes it easy to recognize the relationship between the vehicle and its surrounding area.

However, when a border portion between the vehicle and its outside area is to be photographed with the cameras provided at multiple locations on the vehicle and the resulting images are to be combined to provide a combined image, if the cameras are installed on door mirrors and so on at positions away from the vehicle, the border portion between the vehicle and its outside area can be almost correctly displayed using the combined image. However, cameras at a front end portion and a rear end portion of the vehicle are installed at positions slightly retracted from the front end portion and the rear end portion of the vehicle. Thus, part of a front area and a rear area of the vehicle surroundings is hidden from the cameras by part of the vehicle. Thus, even if the image captured by the camera is combined with other images, it is impossible to capture an image of an area adjacent to the front end portion or the rear end portion of the vehicle.

According to processing performed by a vehicle-mounted image capturing apparatus disclosed in Japanese Patent Application No. 3300334, for example, areas outside and adjacent to the vehicle whose image cannot be captured is regarded as a blind area or a precaution area and is filled with a certain color.

In such a known technique in which the combined image of surrounding areas outside the vehicle and an illustration image of the vehicle are combined, only the border line between the combined image and the illustration image, i.e., the border line indicating an outer edge portion of the vehicle, is displayed. Thus, it is difficult for an operator who views a display screen to recognize the actual vehicle border portion, making him/her feel unsure about the distance between the actual vehicle outer edge portion and an obstacle. Also, with the technique in which a vehicle illustration image is displayed on the display screen, the operator cannot check, for example, the steering angle of the front wheels by using the image.

When the blind area or the precaution area is filled with a specific color, as disclosed in Japanese Patent Application No. 3300334, the operator who views the display screen cannot intuitively recognize what the color-filled portion represents, i.e., whether the portion represents part of the vehicle or the ground, and thus cannot recognize the position of the outer edge portion of the vehicle.

SUMMARY OF THE INVENTION

In order to overcome the above-described problems of the related art, an object of the present invention is to provide a vehicle-mounted image capturing apparatus that makes it easy for an operator who views an image, displayed by combining images captured by multiple cameras, to intuitively recognize the border portion between the actual vehicle and its outside area.

A first embodiment of the present invention provides a vehicle-mounted image capturing apparatus including: cameras provided at multiple locations on a vehicle, each camera being directed to capture an image in a range of an area away from the vehicle to part of the vehicle and being provided with a lens that is capable of focusing light of an image of a wide-angle space area and a photodetector device for detecting the light focused by the lens; an image processor that performs combination processing for combining the images captured by the respective cameras and fitting an actual image of part of the vehicle into at least one image-absent portion where an image of a surrounding area adjacent to the vehicle is not present in the combined image, the actual image of the part of the vehicle being captured by the camera directed toward the image-absent portion; and a display device for displaying the combined image obtained by the processing performed by the image processor.

In this vehicle-mounted image capturing apparatus, images captured by the cameras are combined and the resulting image is displayed, but images of outside areas, such as the ground, that lie at positions adjacent to the vehicle and that are obliquely below in front of a camera cannot be captured since they are hidden by parts of the vehicle. Accordingly, during combination of the images, a portion of the vehicle which is captured by the camera is displayed as an actual image in the image-absent portion. That is, an image obtained by obliquely viewing the portion of the vehicle is fitted into the image-absent portion. This, therefore, can prevent an unnatural appearance of the image, which is caused by, for example, providing an area showing nothing or an area filled with a certain color on the display screen. In addition, the operator who views the image screen can directly view the actual image of the portion of the vehicle, thus making it easier to recognize the relationship between the vehicle and its surrounding area and the positional relationship between the vehicle and an obstacle nearby.

For example, the image processor may perform combination processing for combining an illustration border line indicating a contour of the vehicle with the combined image, and the display device may display both the illustration border line and the actual image of the part of the vehicle, with the actual image being fitted into the image-absent portion.

The actual image of the part of the vehicle fitted into the image-absent portion may include at least one of an actual image of a front end portion of the vehicle and an actual image of a rear end portion of the vehicle, and the illustration border line may indicate a right-side edge and a left-side edge of the vehicle.

The term "illustration border line" as used herein refers to an illustrated image showing only the border line between the vehicle and its outside area in a projected image as viewed from above the vehicle. In the area surrounded by the illustration border line, an illustration of the shape of the vehicle may be drawn, nothing may be drawn, or the area may be filled with a certain color.

The image processor may perform combination processing for combining an illustration image of the vehicle with the combined image, and the display device may display both the vehicle illustration image and the actual image of the part of the vehicle fitted into the image-absent portion.

The actual image of the part of the vehicle fitted into the image-absent portion may include at least one of an actual image of a front end portion of the vehicle and an actual image of a rear end portion of the vehicle, and the display device may display the at least one of the front end portion and the rear end portion of the vehicle and display a left-side edge and a right-side edge of the vehicle illustration image.

The term "vehicle illustration image" as used herein refers to an image having substantially the same size and substantially the same contour as an image of the vehicle viewed from above. Inside the contour, images of the shapes of the windows and the hood of the vehicle as viewed from above may be drawn. Alternatively, the area inside the contour may be filled with a certain color without anything drawn therein.

A vehicle color in the vehicle illustration image and the actual image of the part of the vehicle fitted into the image absent portion may have the same hue or hues similar to each other.

The cameras may further include other cameras that are capable of capturing images of border portions between the vehicle and surrounding areas outside the vehicle, and the display device may display both the actual images of the border portions captured by the other cameras and the actual images of the parts of the vehicle fitted into the image-absent portions.

The display device may display an entire perimeter of the vehicle by using the actual images of the border portions captured by the other cameras and the actual images of the parts of the vehicle fitted into the image-absent portions. The actual images of the border portions captured by the other cameras may show a left-side and a right-side of the vehicle. The actual images of the parts of the vehicle fitted into the image-absent portions may represent an actual image of a front end portion of the vehicle and an actual image of a rear end portion of the vehicle.

The other cameras may be installed on the door mirrors at positions spaced away from the vehicle, and consequently, the border line between the vehicle and the ground and so on in areas outside the vehicle can be directly photographed from above.

As described above, when actual images captured by the cameras are shown along the entire perimeter of the vehicle, it is possible for the operator who views the display device to intuitively recognize the relationship between the actual vehicle and its surrounding area.

In the first embodiment of the present invention, the actual images of the border portions captured by the other cameras may include images of the front wheels, and the display device can display a steering direction of the front wheels.

A second embodiment of the present invention provides a vehicle-mounted image capturing apparatus including: cameras provided at multiple locations on a vehicle, each camera being directed to capture an image in a range of an area away from the vehicle to part of the vehicle and being provided with a lens that is capable of focusing light of an image of a wide-angle space area and a photodetector device for detecting the light focused by the lens; an image processor that performs combination processing for combining the images captured by the respective cameras into an image of the surrounding areas outside the vehicle and for combining an illustration image of the vehicle with the combined surrounding-area image, and that performs combination processing for fitting an actual image of part of the vehicle captured by one of the cameras into at least part of the border portion between the combined surrounding-area image and the vehicle illustration image; and a display device for displaying the combined image generated by the image processor.

In the second embodiment of the present invention, since the vehicle illustration image and the image of the surrounding area can be displayed together on a display screen, the arrangement makes it possible to recognize the contour of the vehicle. Since the actual image of the vehicle is fitted into at least part of the border portion between the vehicle and the surrounding area, the arrangement makes it possible to directly recognize the positional relationship between the part of the vehicle and an obstacle, etc. in its surroundings.

For example, the actual image of the part of the vehicle may include at least one of a front end portion and a rear end portion of the vehicle. The actual image of the part of the vehicle may include at least one of a right-side and a left-side of the vehicle.

In the second embodiment of the present invention, the actual image of the part of the vehicle may include an image of a front wheel, and the display device can display a steering direction of the front wheel.

In this case, a vehicle color in the vehicle illustration image and the actual image of the part of the vehicle may also have the same hue or hues similar to each other.

In the vehicle-mounted image capturing apparatus according to the first embodiment of the present invention, when the combined image projected into an image as viewed from above the vehicle has an image-absent portion where an image adjacent to the vehicle cannot be captured by the cameras, the actual image of part of the vehicle is fitted into the image-absent portion. That is, it is possible to prevent a situation in which no image is displayed in the image-absent portion and it is possible to prevent the occurrence of an unnatural display state, such as a state in which a color-filled portion that is irrelevant to the vehicle and/or the landscape of its outside area is generated. In addition, it is possible to display the vehicle and its outside area in a natural state. Additionally, since the actual image of part of the vehicle is provided in the image-absent portion, this arrangement makes it easy to directly recognize the positional relationship between the vehicle in the actual image and an obstacle or the like on the ground.

In the vehicle-mounted image capturing apparatus according to the second embodiment of the present invention, the combined image and the vehicle illustration image are displayed and the actual image of the vehicle is fitted into at least part of the vehicle illustration image. This arrangement makes it easy to recognize, on part of the actual image, the positional relationship between the vehicle and an obstacle, etc. that lies outside the vehicle.

DESCRIPTION OF THE PREFERRED EMBODIMENTS

An embodiment of the present invention will now be described below with reference to the accompanying drawings.

Figure 1:
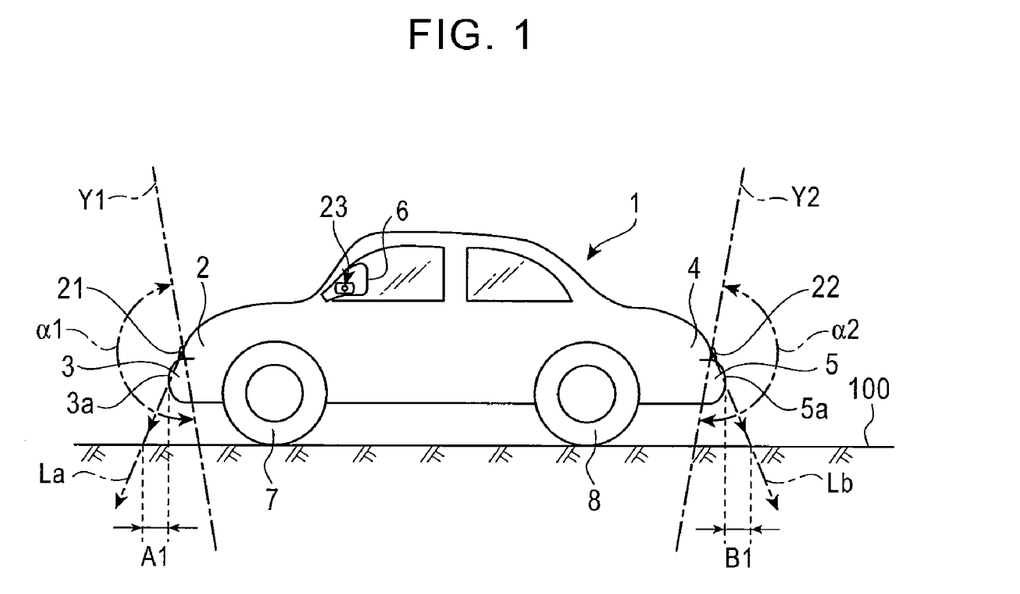
FIG. 1 is a side view of a vehicle equipped with a vehicle-mounted image capturing apparatus according to an embodiment of the present invention.
Figure 2:
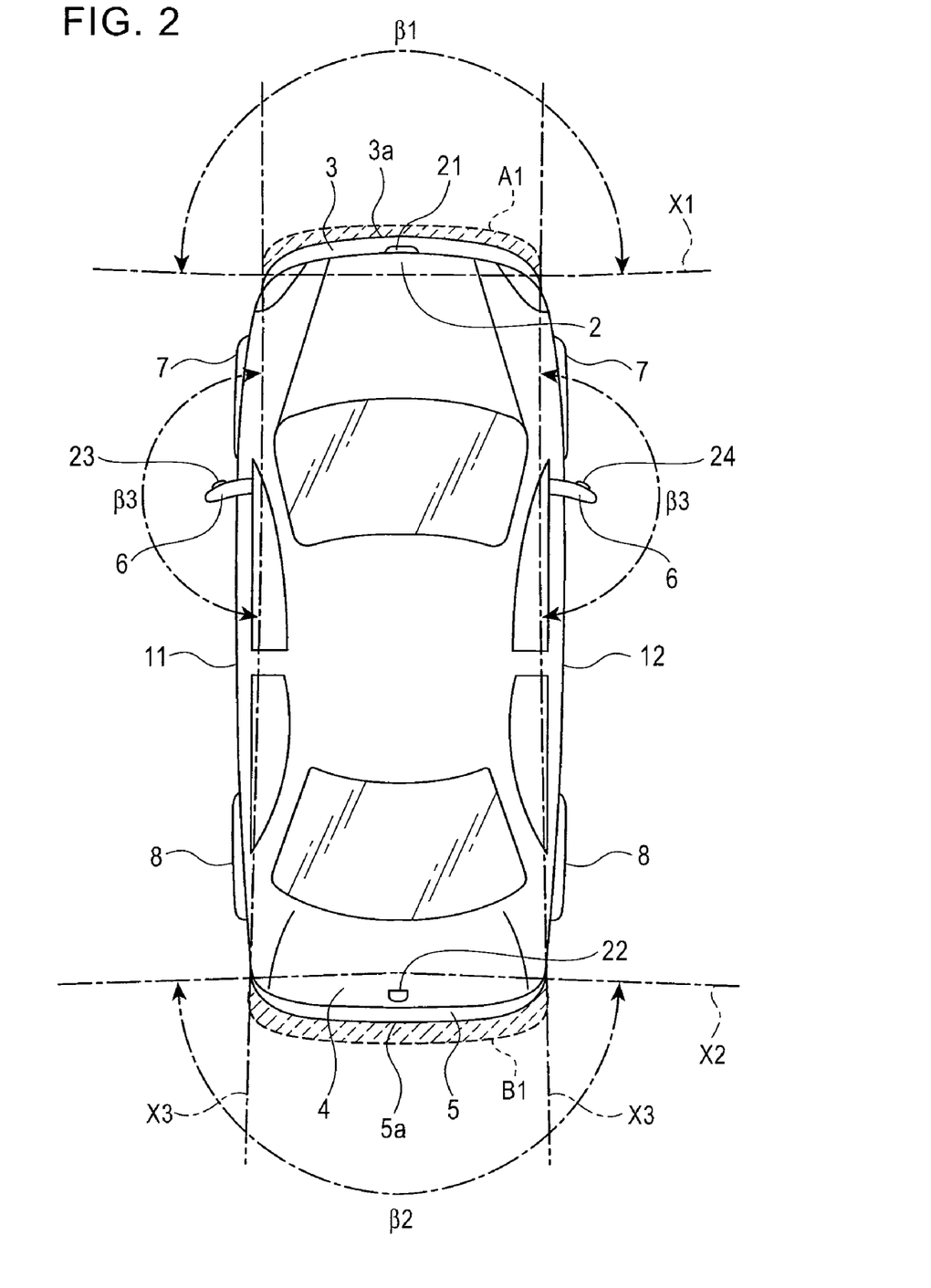
FIG. 2 is a plan view of the vehicle equipped with the vehicle-mounted image capturing apparatus according to the embodiment of the present invention.
Figure 3:
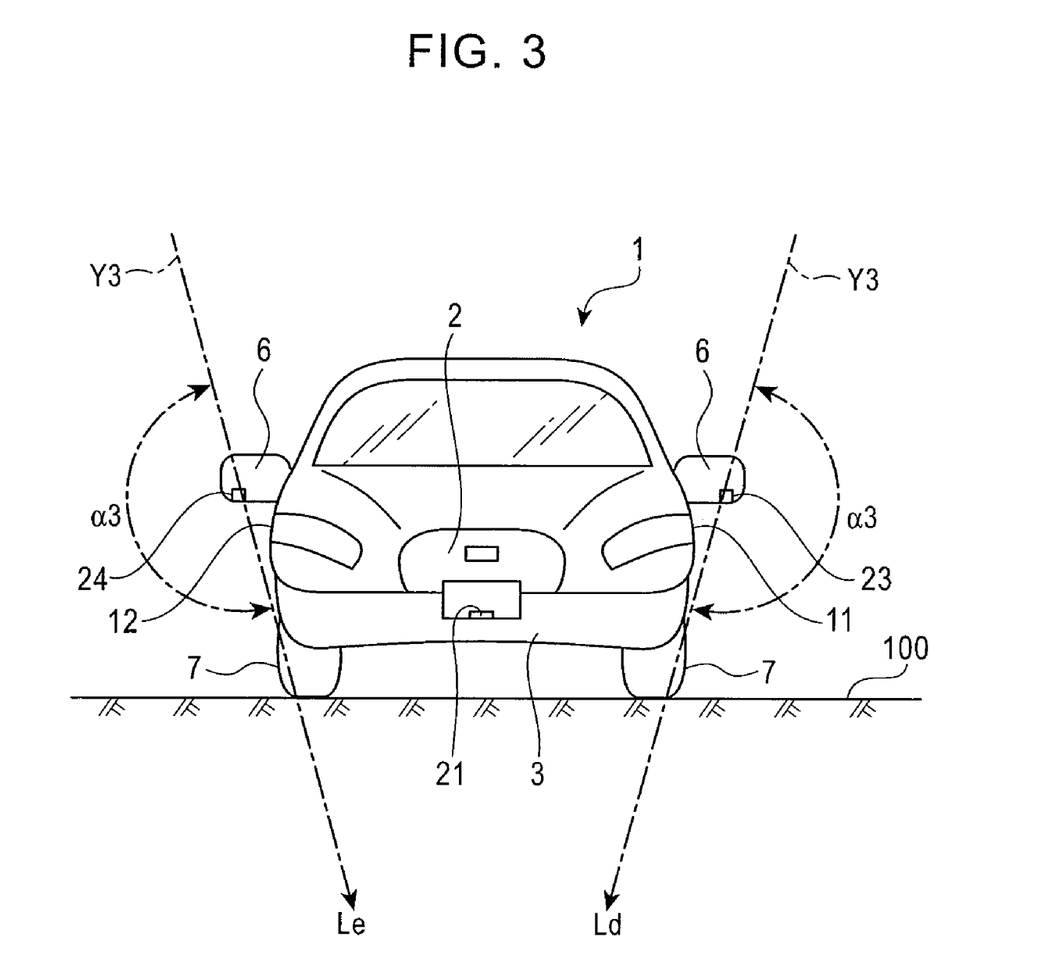
FIG. 3 is a front view of the vehicle equipped with the vehicle-mounted image capturing apparatus according to the embodiment of the present invention.

FIGS. 1 to 3 show a vehicle 1, such as an automobile, and the illustration thereof represents an actual vehicle, not an image displayed on a display screen of a display device.

The vehicle 1 has a front bumper 3 at its front end portion 2 and has a rear bumper 5 at its rear end portion 4. The vehicle 1 has front wheels 7 and rear wheels 8 at its two opposite side portions. At the opposite side portions of the vehicle 1, door mirrors 6 are provided between the front wheels 7 and the rear wheels 8 and above and adjacent to the front wheels 7, respectively.

At the front end portion 2 of the vehicle 1, a front camera 21 is disposed. The front camera 21 is positioned at substantially the center of the lateral dimension of the vehicle 1. As shown in FIGS. 1 and 2, the front camera 21 is positioned slightly rearward of a front end portion 3a of the front bumper 3, the front end portion 3a being located at the frontmost end of the vehicle 1. At the rear end portion 4 of the vehicle 1, a rear camera 22 is disposed. The rear camera 22 is positioned at substantially the center of the lateral dimension of the vehicle 1. As shown in FIGS. 1 and 2, the rear camera 22 is positioned slightly forward of a rear end portion 5a of the rear bumper 5, the rear end portion 5a being located at the rearmost end of the vehicle 1.

The left door mirror 6 is provided with a left camera 23 and the right door mirror 6 is provided with a right camera 24. As shown in FIG. 2, the left camera 23 is positioned away from a left side surface 11 of the vehicle 1 and the right camera 24 is positioned away from a right side surface 12 of the vehicle 1.

Each of the cameras 21, 22, 23, and 24 has a fisheye lens and a photodetector device (an image capture device) having multiple detection points for detecting light focused by the fisheye lens. The photodetector device may be a CCD (charge coupled device) or a CMOS (complementary metal oxide semiconductor) device.

The fisheye lens may be constituted by a combination of lenses. The photodetector device of each of the cameras 21, 22, 23, and 24 which use the fisheye lens has a wide view angle, for example, in the range of 150° to 180° or in the range of 150° to 190°.

The front camera 21 is disposed so that the optical axis thereof is directed forward and is tilted slightly downward from the horizontal plane toward the ground 100. Similarly, the rear camera 22 is disposed so that the optical axis thereof is directed rearward and is tilted slightly downward from the horizontal plane toward the ground 100.

In FIG. 1, $\alpha 1$ indicates a vertical view angle of the front camera 21, and Y1 indicates the limit of the field of view at the view angle $\alpha 1$. In FIG. 2, X1 indicates the limit of a horizontal field of view of the ground 100 which can be photographed by the front camera 21. The limit X1 corresponds to an intersection between the limit Y1 at the vertical view angle and the ground 100. $\beta 1$ indicates a horizontal view angle defined by the limit Y1.

Similarly, In FIG. 1, $\alpha 2$ indicates a vertical view angle of the rear camera 22, and Y2 indicates the limit of the field of view at the view angle $\alpha 2$. In FIG. 2, X2 indicates the limit of a horizontal field of view of the ground 100 which can be photographed by the rear camera 22. The limit X2 corresponds to an intersection between the limit Y2 at the vertical view angle and the ground 100. $\beta 2$ indicates a horizontal view angle defined by the limit Y2.

As shown in FIG. 3, the optical axes of the left camera 23 and the right camera 24 are set so that they are directed toward the left and the right, respectively, and are also tilted downward from the horizontal plane toward the ground 100.

In FIG. 3, $\alpha 3$ indicates a vertical view angle of each of the left camera 23 and the right camera 24, and Y3 indicates the limit of the field of view at the view angle $\alpha 3$. In FIG. 2, X3 indicates the limit of the vertical field of view of the ground 100 which can be photographed by each of the left camera 23 and the right camera 24. The limit X3 corresponds to an intersection between the vertical limit Y3 and the ground 100. $\beta 3$ indicates a horizontal view angle defined by the limit X3. As illustrated, the maximum values of the view angles $\alpha 1$, $\beta 1$, $\alpha 2$, $\beta 2$, $\alpha 3$, and $\beta 3$ are about 180°, or may be 190° or greater, depending on the specifications of the fisheye lenses.

Figure 5:
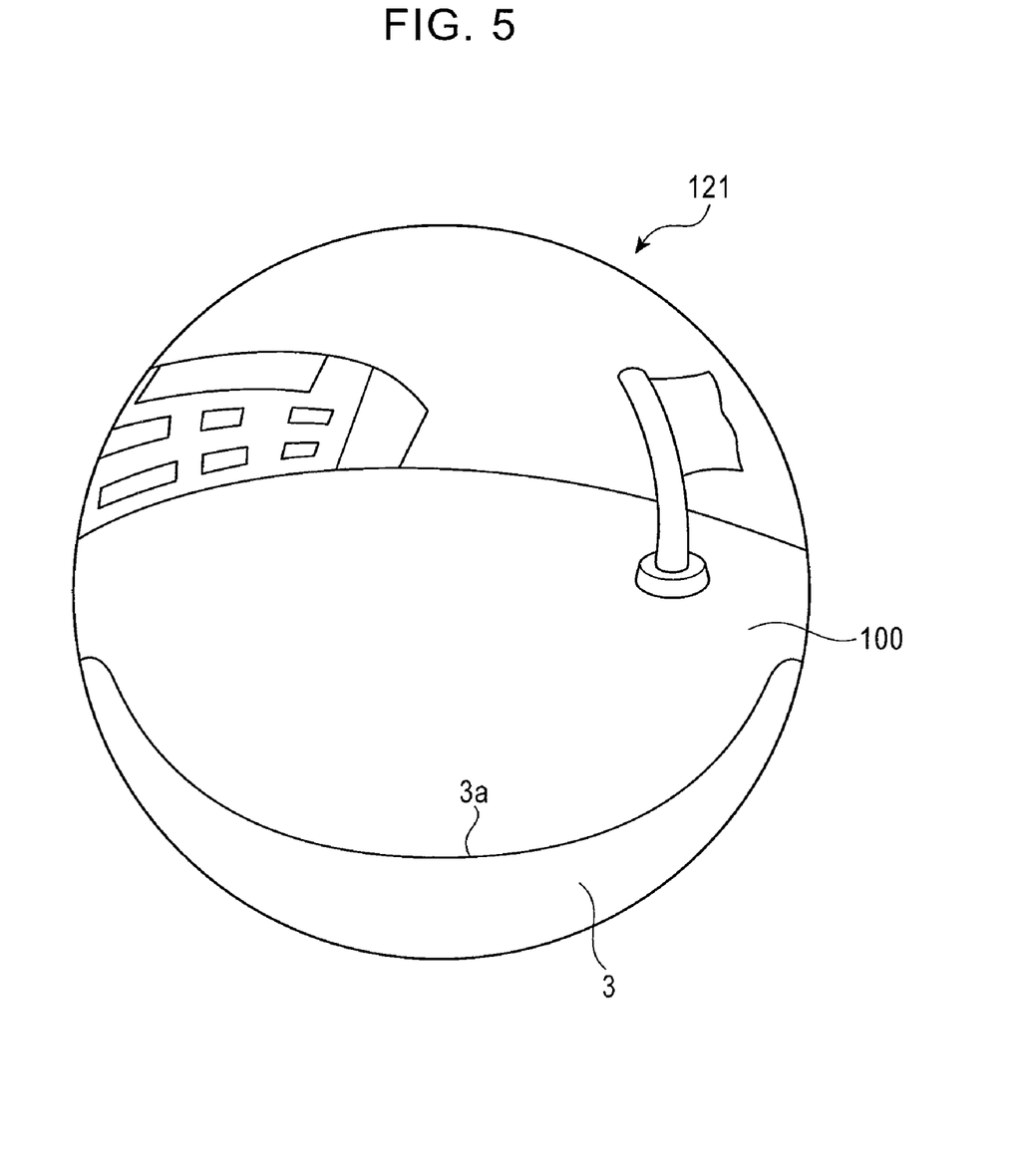
FIG. 5 illustrates an actual image captured by a front camera.

FIG. 5 shows an actual image 121 whose light was focused by the fisheye lens of the front camera 21 and captured by the photodetector device (such as a CCD) having multiple light-receiving pixels arranged in a plane. The actual image 121 shows a landscape ahead of the vehicle 1 in the range of the view angles $\alpha 1$ and $\beta 1$. As shown in FIG. 1, however, since the lens of the front camera 21 is positioned rearward of the front end portion 3a of the front bumper 3, the surrounding area including the ground 100, obstacles, and so on which exists immediately adjacent to the front end portion 3a is hidden by the front bumper 3, and thus an image of the immediately adjacent surrounding area cannot be captured.

In FIG. 1, A1 indicates an area where an image cannot be captured by the front camera 21, the area being located forward of the front end portion 3a. In FIG. 2, the area A1 where an image cannot be captured by the front camera 21, the area being viewed downward along a line of sight that is perpendicular to the ground 100 from above the vehicle 1, is indicated by hatching. The area A1 is herein referred to as a "front-side image-absent portion".

The actual image 121 shown in FIG. 5, however, shows the front bumper 3, which is a portion of the vehicle 1 and which hides the image-absent portion A1 obliquely from the side nearer than the image-absent portion A1.

Figure 6:
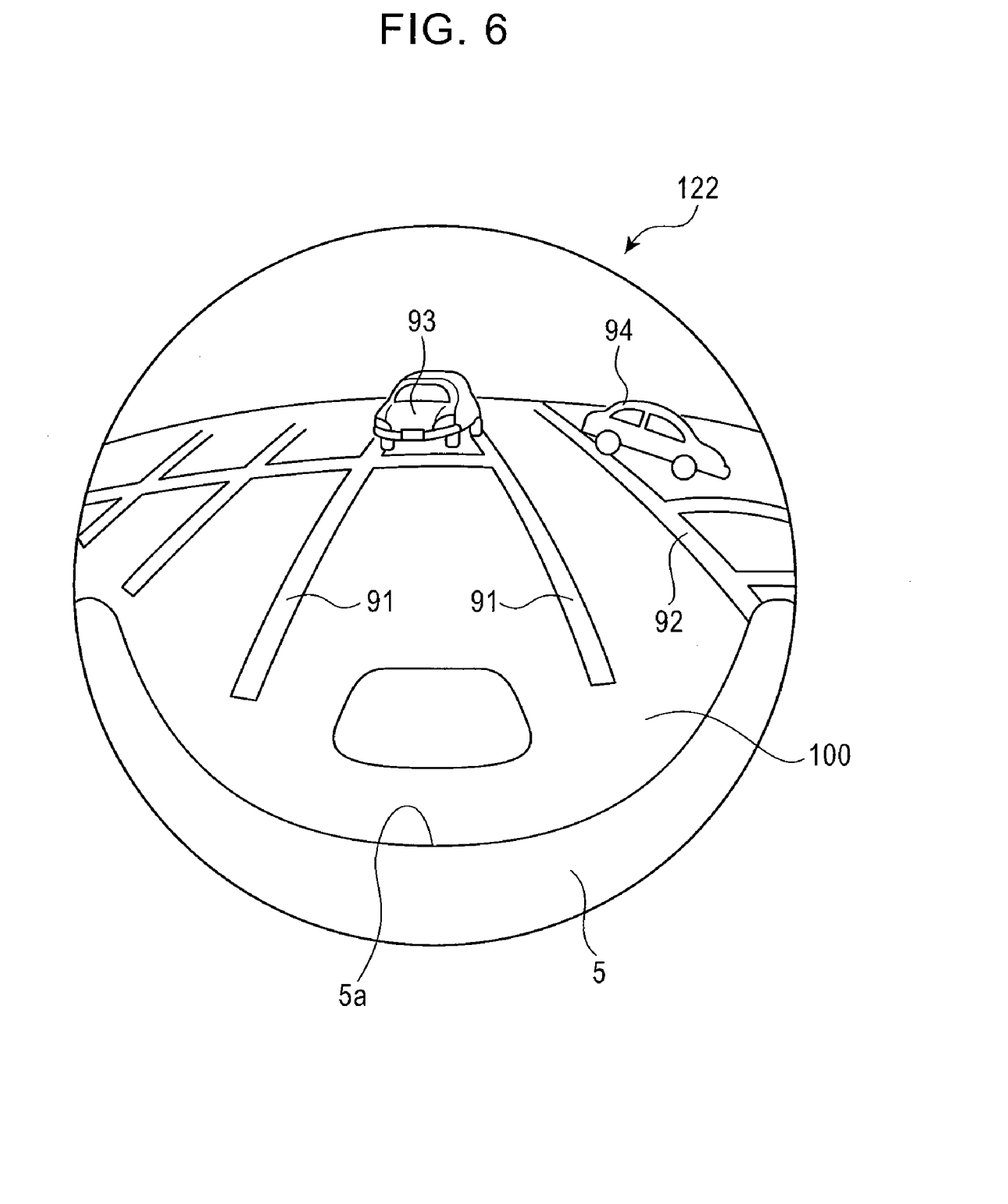
FIG. 6 illustrates an actual image captured by a rear camera.

FIG. 6 shows an actual image 122 whose light was focused by the fisheye lens of the rear camera 22 and captured by the photodetector device, such as a CCD. The actual image 122 shows a landscape behind the vehicle 1 in the range of the view angles $\alpha 2$ and $\beta 2$. As shown in FIG. 1, the lens of the rear camera 22 is disposed slightly forward of the rear end portion 5a of the rear bumper 5. Thus, of the ground 100, obstacles, and so on photographed by the rear camera 22, an image of an area immediately adjacent to the rear end portion 5a of the rear bumper 5 cannot be captured. The area where an image cannot be obtained is indicated by B1 in FIG. 1 and is also shown as a hatched area indicated by B1 in FIG. 2. The area B1 is herein referred to as a "rear-side image-absent portion". As shown in FIG. 2, the image-absent portion B1 is an image that is supposed to be seen when the entire area is viewed from above with a field of view perpendicular to the ground 100.

The actual image 122 shown in FIG. 6, however, shows part of the rear bumper 5 that hides the image-absent portion B1.

In the actual image 122 shown in FIG. 6, behind the vehicle 1, white lines 91 painted on the ground 100 and a side white line 92 painted on the ground 100 at a position more leftward than the left side surface 11 of the vehicle 1 are shown distorted. Further, an image of another vehicle 93 located immediately behind the vehicle 1 and an image of another vehicle 94 located behind and to the left of the vehicle 1 are shown distorted.

Figure 7:
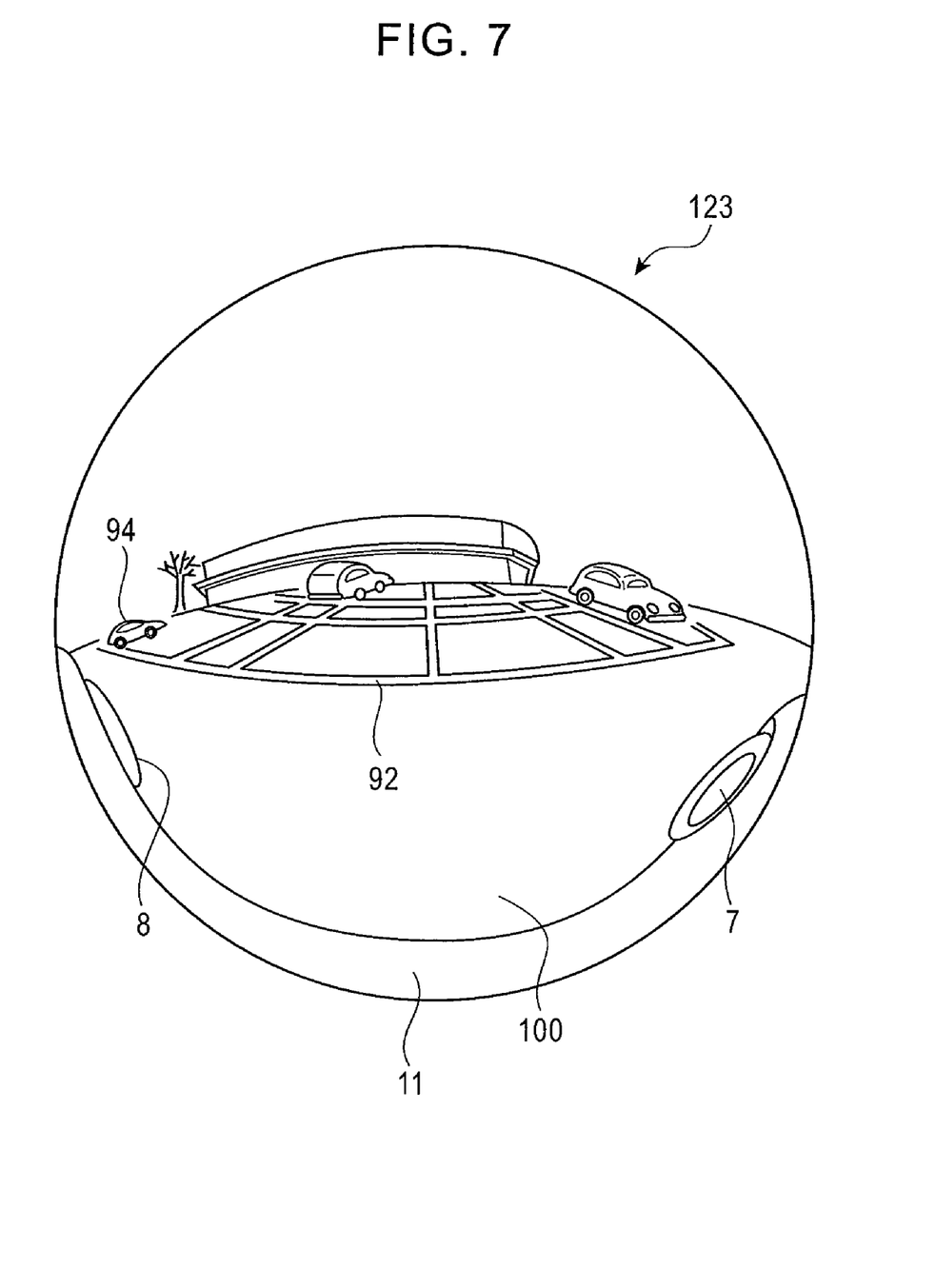
FIG. 7 illustrates an actual image captured by a left camera.

FIG. 7 shows an actual image whose light was focused by the fisheye lens of the left camera 23 and captured by the photodetector device, such as a CCD. The view angle of this video is in the range of α3 and β3. As shown in FIG. 3, the left camera 23 is disposed at the door mirror 6 at a position away from the left side surface 11 of the vehicle 1, and the optical axis of the lens of the left camera 23 is tilted slightly downward from the horizontal plane toward the ground 100. Thus, in the actual image 123, the entire area of a lower portion of the left side surface 11 of the vehicle 1 is shown in the forward and rearward directions, and the front wheel 7 and the rear wheel 8 are also shown. As is apparent from the limit Y3 of the view angle shown in FIG. 3, the actual image 123 shown in FIG. 7 clearly shows the border portion between the vehicle 1 and the ground 100, that is, the contact portion between the front wheel 7 and the ground 100 and the contact portion between the rear wheel 8 and the ground 100.

The actual image 123 shown in FIG. 7 does not have an area that lacks an image of the ground 100 that lies adjacent to the vehicle 1 like the front-side image-absent portion A1 and the rear-side image-absent portion B1 shown in FIGS. 1 and 2.

The actual image 123 shown in FIG. 7 also shows the side white line 92 painted on the ground 100 on the left side of the vehicle 92 and the vehicle 94 located behind and to the left of the vehicle 1, the white line 92 and the vehicle 94 also being shown in FIG. 6.

Although not shown, an image captured by the right camera 24 is similar to the image shown in FIG. 7 and shows a lower portion of the right side surface 12, the front wheel 7, and the rear wheel 8 of the vehicle 1. That is, the image captured by the right camera 24 also shows the border portion between the right side surface 12 of the vehicle 1 and the ground, i.e., the contact portion between the front wheel 7 and the ground 100 and the contact portion between the rear wheel 8 and the ground 100.

Figure 4:
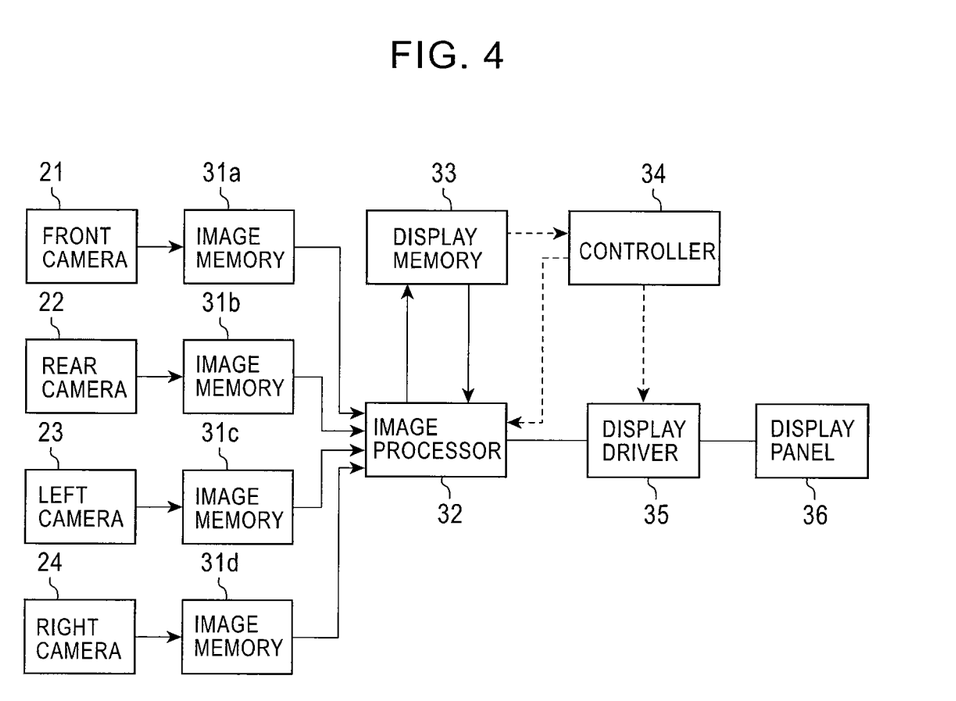
FIG. 4 is a circuit block diagram of the vehicle-mounted image capturing apparatus.

FIG. 4 is a block diagram showing a circuit configuration for processing images captured by the cameras and displaying the resulting image.

An image detected by the photodetector device, such as a CCD, of the front camera 21 is sent to an image memory 31a and is stored therein. Similarly, images detected by the photodetector devices of the rear camera 22, the left camera 23, and the right camera 24 are sent to an image memory 31b, an image memory 31c, and an image memory 31d and stored therein, respectively.

Signals of the images detected by the photodetector devices of the cameras 21, 22, 23, and 24 are sent from the respective image memories 31a, 31b, 31c, and 31d to an image processor 32 as pixel data for each pixel. The image processor 32 is provided with a display memory 33 in parallel therewith. Pixel data of video that changes in real time is stored in the display memory 33 and is then subjected to image processing by the image processor 32. A controller 34 controls the image processor 32 and the display memory 33. The controller 34 is mainly implemented by a programmed CPU (central processing unit) to control the image processor 32 and a display driver 35. The image data resulting from the processing performed by the image processor 32 is sent to the display driver 35, so that an image is displayed on a display panel 36, such as a liquid crystal display panel, provided in the vehicle 1.

A typical projection model obtained by the fisheye lens used for each of the cameras 21, 22, 23, and 24 is an equidistant projection and is given by:

$$ra = f \cdot \theta i$$

where ra indicates an image height and f indicates a focal length.

In the projection models of other fisheye lenses, the equisolid angle projection is given by:

$$ra = 2f \cdot \sin(\theta i/2)$$

and the orthogonal projection is given by:

$$ra = f \cdot \sin \theta i.$$

When one can know a projection model of a fisheye lens having an optical axis that extends perpendicularly from the center of an image capture plane defined by a planar photodetector device (such as a CCD) included in a camera, it is possible to know at which zenith angle a line on which the original spatial point for each image point focused on the image capture plane lies is oriented relative to the optical axis and it is also possible to know at which azimuth angle around the optical axis the spatial point is located.

Thus, if one can know the position of the installed camera and the direction of the optical axis, it is possible to compute in which direction, by how much, and which part of each image shown in FIGS. 5 to 7 should be enlarged to allow the image to be projected onto a plane image that is parallel to the ground 100, based on the projection model of the fisheye lens of the camera. That is, the pixel data stored in the image memories 31a, 31b, 31c, and 31d are supplied to the image processor 32 after being temporarily stored in the display memory 33, and are subjected to enlargement processing or reduction processing thereby in accordance with the coordinate positions of the respective pixel data. The pixel data are then fitted into corresponding positions in a plane image that is parallel to the ground 100, so that a combined image projected on a plane is provided.

As shown in FIG. 2, the image captured by the front camera 21 and the image captured by the left camera 23 have an overlapping portion in front of and to the left of the vehicle 1, and the image captured by the front camera 21 and the image captured by the right camera 24 have an overlapping portion in front of and to the right of the vehicle 1. Similarly, the image captured by the rear camera 22 and the image captured by the left camera 23 have an overlapping portion behind and to the left of the vehicle 1. In the actual image 122 (shown in FIG. 6) captured by the rear camera 22 and the actual image 123 (shown in FIG. 7) captured by the left camera 23, the image of the vehicle 94 and the image of the white line 92 are in the overlapping portion. The image captured by the rear camera 22 and the image captured by the right camera 24 also have an overlapping portion behind and to the right of the vehicle 1.

With respect to the overlapping portion of the images captured by two cameras, the image processor 32 uses the image sent from a predetermined one of the cameras. In this case, it is desired that, of the actual images detected by the photodetector devices, the image having a low reduction ratio be used in order to enhance the quality of the display image, as shown in FIGS. 5 to 7.

As described above, the image processor 32 combines pixel data obtained from the image memories 31a, 31b, 31c, and 31d into an image projected on a coordinate plane that is parallel to the ground 100 around the vehicle 1. Under the control of the controller 34, the plane image combined by the image processor 32 is time-sequentially sent to the display driver 35, so that moving-picture display data is generated. Based on the display data, a combined image is displayed on the display screen of the display panel 36. That is, the combined image is displayed on the display screen as a moving picture that changes over time.

Figure 8:
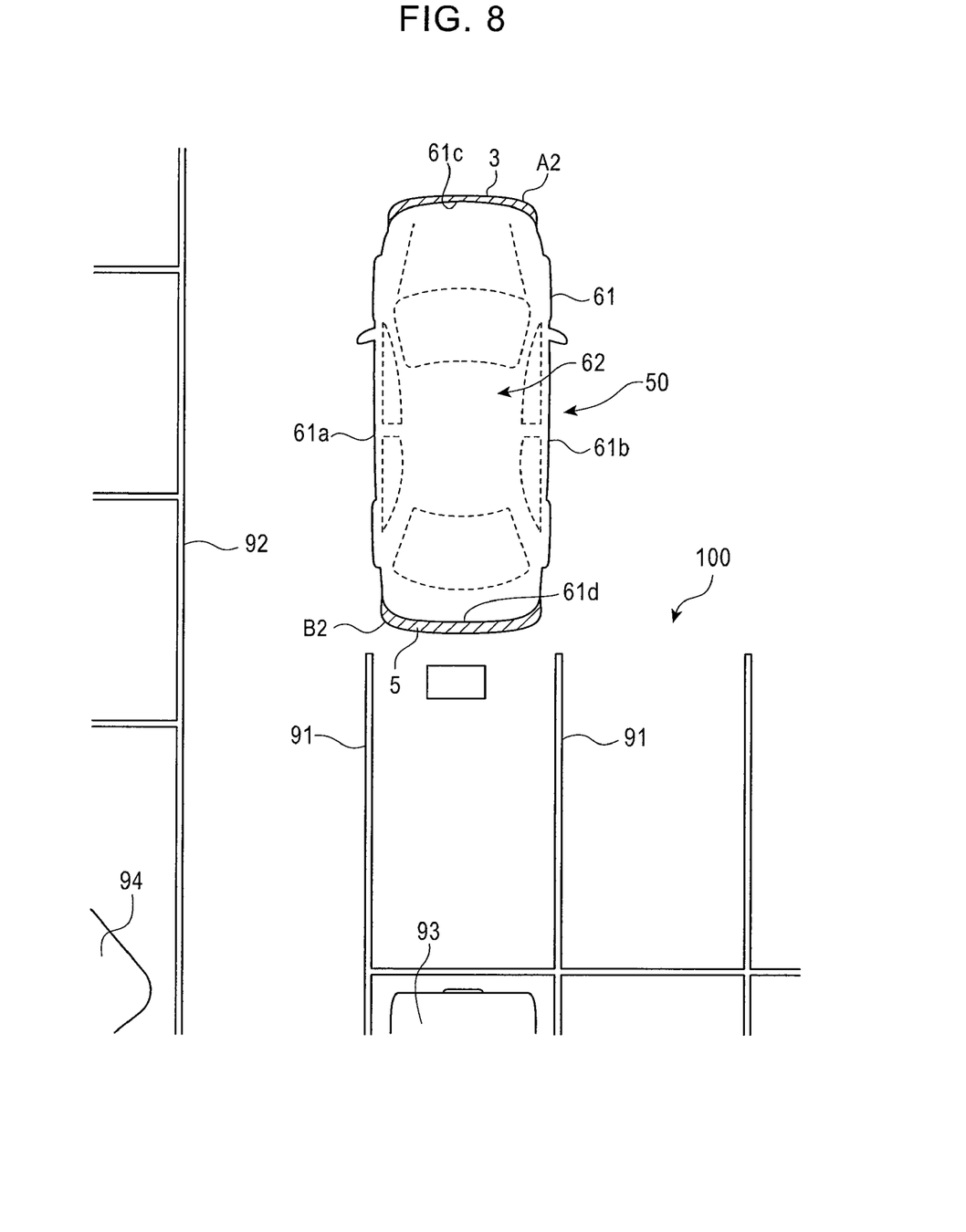
FIG. 8 illustrates an example of an image displayed on a display screen.

FIG. 8 is a partially enlarged view showing one example of the image displayed on the display screen of the display panel 36, such as a liquid crystal display panel. Of the actual images (shown in FIGS. 5 to 7) captured by the cameras, an image of the ground 100 which is an image of an area around the vehicle 1 is processed by the image processor 32 and is converted into an image projected on a coordinate plane. The ground 100 that lies around a vehicle display portion 50 is mainly displayed on the display screen as a plane image.

As shown in FIG. 8, an image projected on a coordinate plane that is parallel to the ground 100 is generated, the white lines 91 painted on the ground 100 are displayed on the display screen so that they extend substantially parallel to each other behind the vehicle 1, and a plane image of the vehicle 93 located behind the vehicle 1 is displayed. The white line 92 of the actual image captured by the left camera 23 shown in FIG. 7 is displayed in such a manner that it extends linearly in the forward and backward directions at the left side of the vehicle display portion 50. Also, based on the actual image 122 shown in FIG. 6 and the actual image shown in FIG. 7, an image of the vehicle 94 is displayed diagonally behind the vehicle display portion 50.

Through the combination of images obtained from the actual image 122 shown in FIG. 6 and the actual image 123 shown in FIG. 7 or through the use of one of the actual images 122 and 123, the vehicle 93 and the vehicle 94 are displayed with shapes that are slightly tilted in the image (FIG. 8) projected on the plane.

As shown in FIG. 8, the vehicle display portion 50 has an illustration border line 61. Drawing data of the illustration border line 61 is stored in a memory (not shown) provided for the image processor 32 shown in FIG. 4. As shown in FIG. 8, when the image of the ground 100 is displayed on the display screen in real time, the position where the vehicle 1 exists in the image of the ground 100 is estimated as the vehicle display portion 50, and the illustration border line 61 is rendered on the estimated position.

As shown in FIG. 7, the actual image 123 captured by the left camera 23 directly provides an image of the border portion between the left side surface 11 of the vehicle 1 and the ground 100. Thus, during the projection of the actual image 123 shown in FIG. 7 onto the plane image, the image processor 32 can recognize information as to where the border line between the left side surface 11 of the vehicle 1 and the ground 100 lies within the display screen shown in FIG. 8. Determining the drawing position of a left-side portion 61a of the illustration border line 61 based on the information allows the left-side portion 61a to be displayed at a corresponding position that is substantially the same as the actual border line between the left side surface 11 of the vehicle 1 and the ground 100. Similarly, the drawing position of a right-side portion 61b of the illustration border line 61 can be determined based on information obtained from the right camera 24.

A front-end portion 61c and a rear-end portion 61d of the illustration border line 61 can be drawn based on information of the drawing positions of the left-side portion 61a and the right-side portion 61b and information of the size of the vehicle 1. Thus, the front-end portion 61c of the illustration border line 61 is drawn at a position that substantially corresponds to the front end portion 3a of the front bumper 3 of the actual vehicle 1 and the rear-end portion 61d of the illustration border line 61 is drawn at a position that substantially corresponds to the rear end portion 5a of the rear bumper 5 of the actual vehicle 1.

The area surrounded by the illustration border line 61 corresponding to the contour of the vehicle 1 may or may not contain any image. The area surrounded by the illustration border line 61 may be displayed with the entire area being filled with white or another single color.

Alternatively, as shown in FIG. 8, an image of the windows and/or the hood may be drawn in the area surrounded by the illustration border line 61. Such an arrangement allows the area surrounded by the illustration border line 61 to be displayed as an illustration image 62 that is equivalent to an image of the vehicle 1 in plan view as viewed from above.

When the illustration border line 61 is drawn so as to correspond to the contour of the vehicle 1, the front-side image-absent portion A1 shown in FIGS. 1 and 2 exists in the area A2 located in front of the front-end portion 61c of the illustration border line 61, and an image of the ground 100 cannot be displayed in the area A2.

Accordingly, in the display example shown in FIG. 8, an actual image of the front bumper 3, which is a portion of the vehicle 1 photographed on the actual image 121 shown in FIG. 5, is combined with the area A2. However, since the actual image 121 shown in FIG. 5 is an image whose light was focused by the fisheye lens, the entirety thereof is distorted. Thus, when the actual image 121 is projected onto the coordinate plane, it is converted so that the actual image of the front bumper 3 becomes an image that extends in a plane on the coordinate plane, and the front bumper 3 in the actual image 121 is projected and displayed in a plan view shape that is the same as the image of the actual bumper 3 as viewed from above. In this case, the actual image of the front bumper 3 is displayed with the same scale ratio as that of the illustration border line 61 shown in FIG. 8 and is combined with the area in front of the front-end portion 61c of the illustration border line 61. As a result, the actual image of the front bumper 3 rendered in the plane is displayed at the front-side image-absent portion A1 on the display screen.

The actual image of the front bumper 3 to be combined with the area in front of the front-end portion 61c of the illustration border line 61 in the display image shown in FIG. 8 is obtained by converting an image of the front bumper 3 viewed along a line of sight indicated by an arrow La pointing downwardly forward from the position of the front camera 21, as shown in FIG. 1, and displaying the converted image.

Similarly, as shown in FIGS. 1 and 2, the image-absent portion B1 that exists immediately behind the rear end portion 5a of the rear bumper 5 of the vehicle 1 corresponds to the area B2 behind the rear-end portion 61d of the illustration border line 61 in the display image shown in FIG. 8. Accordingly, the actual image of the rear bumper 5 shown in FIG. 6 is fitted into the area B2 shown in FIG. 8. Since the rear bumper 5 in the actual image 122 captured by the rear camera 22 is displayed in a distorted manner, the image processor 32 projects the actual image of the rear bumper 5 in the actual image 122 so that it is shown on the coordinate plane, and the actual image of the rear bumper 5 is displayed being fitted in the area B2 at the same scale ratio as that of the illustration border line 61 shown in FIG. 8.

As a result, it is possible to eliminate an area where no image exists behind the rear-end portion 61*d* of the illustration border line 61 shown in FIG. 8, and the actual image of the rear bumper 5 converted so as to be equivalent in plan view to the actual vehicle is displayed in that area. The actual image of the rear bumper 5 is an image obtained by rendering an image of the rear bumper 5, viewed along a line of sight indicated by an arrow Lb pointing downwardly backward from the rear camera 22 shown in FIG. 1, into a plane.

In the display image shown in FIG. 8, within the screen, the front image-absent portion A1 does not exist forward of the front-end portion 61*c* of the illustration border line 61 drawn at the position corresponding to the actual vehicle 1, and the image-absent portion B1 also does not exist behind the rear-end portion 61*d*. Thus, an area where no image exists and a display area painted with a single color that is irrelevant to the vehicle do not need to be provided in front of the front-end portion 61*c* of the illustration border line 61 and behind the rear-end portion 61*d*. This can eliminate an operator's sense of uncertainty caused by the interrupted display of images of the area in front of the front-end portion 61*c* and the area behind the rear-end portion 61*d*.

When the vehicle 1 travels backward from the state shown in FIG. 8, the image of the vehicle 93, which is an obstacle that is located behind the vehicle 1, and the actual image of the rear bumper 5 displayed in the area B2 can be checked on the screen. Comparison of the distance between the actual image of the rear bumper 5 of the vehicle 1 and the image of an obstacle (such as a vehicle) located behind the vehicle 1 can significantly reduce the risk of collision between the vehicle 1 and the obstacle.

The area A2 shown in FIG. 8 slightly protrudes forward compared to the image of the actual vehicle 1, and the area B2 slightly protrudes backward compared to the image of the actual vehicle 1. Thus, a safety distance is added to the space between the actual vehicle and the obstacle, so that safety can be enhanced.

As described above, in the image shown in FIG. 8, the actual images of the portions of the vehicle 1 are displayed in the area A2 in front of the front-end portion 61*c* of the illustration border line 61 and the area B2 behind the rear-end portion 61*d*. Thus, the use of the same hue as, or a similar hue to, the color of the vehicle 1 for at least part of the area surrounded by the illustration border line 61 can provide a sense of continuity between the vehicle illustration image 62 surrounded by the illustration border line 61 and the areas A2 and B2 shown in FIG. 8.

Figure 9:
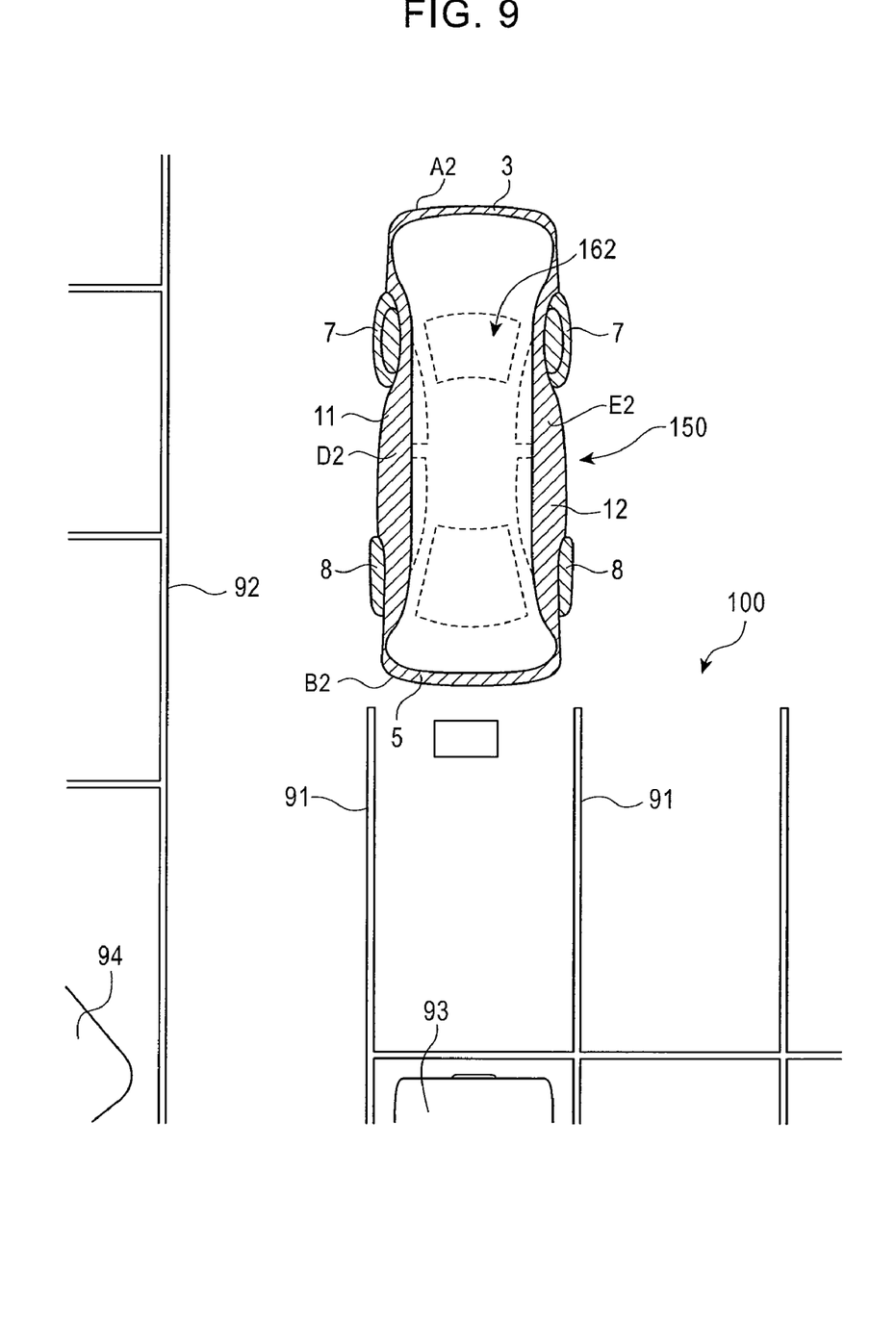
FIG. 9 illustrates another example of an image displayed on the display screen.

FIG. 9 is a diagram illustrating a second example of the image displayed on the display screen of the display panel 36.

In the display example shown in FIG. 9, an image of the landscape around the vehicle 1 is projected onto a coordinate plane and is displayed on the display screen. What is displayed in the surrounding area outside the vehicle 1 is the same as that shown in FIG. 8. In FIG. 9, however, the image of a vehicle display portion 150 is different than the image of the vehicle display portion 50 in the display example shown in FIG. 8.

In the display example shown in FIG. 9, an area A2 and an area B2 that are the same as those of the vehicle display portion 50 shown in FIG. 8 are provided in front of and behind the vehicle display portion 150. The actual image of the front bumper 3 in the actual image 121 shown in FIG. 5 is converted so that it can be projected onto a plane image to be equivalent to an image in plan view of the actual vehicle 1 and the converted image is fitted into the area A2, and the actual image of the rear bumper 5 in the actual image 122 shown in FIG. 6 is projected onto a coordinate plane and the converted image is fitted into the area B2.

Thus, as in the display example shown in FIG. 8, the front image-absent portion A1 is filled with the actual image of the front bumper 3, and the rear image-absent portion B1 is filled with the actual image of the rear bumper 5.

In addition, the images of the left side surface 11, the front wheel 7, and the rear wheel 8 of the vehicle 1 which are obtained on the actual image 123 shown in FIG. 7 are fitted into a left-side area D2 in the vehicle display portion 150 shown in FIG. 9. In this case, the image of the left side surface 11 of the vehicle 1 is projected so that it extends forward and backward, as in the actual vehicle, by the same conversion processing used for projecting the actual image 123 shown in FIG. 7 onto the image on the coordinate plane that is parallel to the ground 100.

As shown in FIG. 3, the left camera 23 is installed on the door mirror 6 and is spaced apart from the left side surface 11 of the vehicle 1. Thus, correcting the distortion of the actual image 123 shown in FIG. 7 and projecting the left side surface 11 of the corrected image so that it extends forward and backward as in the actual vehicle 1 provides an image just like an image of the left side surface 11 viewed along a line of sight indicated by an arrow Ld pointing inward diagonally from the position of the left camera 23 in FIG. 3.

As shown in FIG. 9, the actual image of the left side surface 11 of the vehicle 1 and the actual images of the front wheel 7 and the rear wheel 8 are displayed in the area D2. The border portion between the left side of the vehicle 1 and the ground 100, that is, the contact portion between the front wheel 7 and the ground 100 and the contact portion between the rear wheel 8 and the ground 100, can be displayed on the screen with accurate positions.

From the actual image obtained from the right camera 24, the image of the right side surface 12, the front wheel 7, and the rear wheel 8 of the vehicle 1 are displayed, as actual images, in an area E2 at the right side of the vehicle display portion 150 shown in FIG. 9. This image corresponds to an image of the right side surface 12 viewed along a downward line of sight indicated by an arrow Le from the right camera 24 in FIG. 3. The position of the contact portion between the front wheel 7 and the ground 100 and the position of the contact portion between the rear wheel 8 and the ground 100 can be accurately displayed in the right-side area E2, as well.

The entire perimeter of the vehicle display portion 150 shown in FIG. 9 is surrounded by the actual images of the positions of the vehicle. The area inside the vehicle display portion 150 may contain no image or may be filled with black, white, or any other single color. Alternatively, as shown in FIG. 9, a vehicle illustration image 162 that represents the shape of the windows and/or the hood may be displayed in the area surrounded by the actual images. In this case, it is preferable that the color of the vehicle shown by the illustration image 162 has the same hue as, or similar hue to, the color of the vehicle 1 displayed in the areas A2, B2, D2, and E2.

In the display example shown in FIG. 9, since the image-absent portions A1 and B1 do not exist in the front area A2 and the rear area B2 and the actual images of the front bumper 3 and the rear bumper 5 are instead displayed therein, as in FIG. 8, this arrangement makes it easy to recognize, on the screen, the positions of the front end and the rear end of the vehicle 1.

In addition, since the actual images of the left side surface 11, the front wheel 7, and the rear wheel 8 of the vehicle 1 are displayed in the area D2 of the vehicle display portion 150 and the actual images of the right side surface 12, the front wheel 7, and the rear wheel 8 of the vehicle 1 are displayed in the area E2, this arrangement makes it easy to actually recognize relationships between the left and right portions of the vehicle 1 and obstacles and so on around the vehicle when it is travelling.

In particular, the rotation of the front wheels 7 can be displayed as images, and further, the movement of landscape that is reflected on the left side surface 11 and the right side surface 12 of the vehicle 1 can be displayed. This arrangement make it easy to recognize, on the screen, a sense of movement of the vehicle 1. For example, when the vehicle 1 passes through a narrow road, the arrangement makes it possible to recognize the steering angle of the front wheel 7 and thus makes it possible to recognize, on the screen, whether or not the front wheels 7 when turned left or right make contact with an obstacle, or whether or not a front wheel 7 approaches a ditch. This makes it easy to achieve safe driving.

In the present invention, for example, illustration images or the like, instead of the actual images of the front bumper 3 and the rear bumper 5, may be displayed in the areas A2 and B2 of the vehicle display portion 150 shown in FIG. 9, and portions of the vehicle, the front wheels 7, and the rear wheels 8 may be displayed in at least one of the areas D2 and E2, preferably in both.

The display of the images in the areas D2 and E2, as described above, allows the front wheels 7 and the rear wheels 8 to be displayed slightly obliquely with the viewing axes Ld and Le shown in FIG. 3, with the image of the ground 100 being displayed in a plane, and also allows the movement of the wheels on a flat road to be displayed.

In the display examples shown in FIGS. 8 and 9, the arrangement may be such that the actual image of the vehicle is displayed in one of the areas A2 and B2 and an illustration image or the like is displayed in the other area.

Although the actual images displayed in the areas A2, B2, D2, and E2 are, preferably, images that change in real time, they may be images that are displayed at a time that is different from the actual time, depending on convenience of the image memories or the like.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A vehicle-mounted image capturing apparatus comprising:
    cameras provided at multiple locations on a vehicle, each camera being directed to capture an image in a range of an area away from the vehicle to part of the vehicle and being provided with a lens configured for focusing light of an image of a wide-angle space area and a photodetector device for detecting the light focused by the lens;
    an image processor performing combination processing for combining the images captured by the respective cameras into an image of a surrounding area outside the vehicle and for combining an image of the vehicle with the image of the surrounding area outside the vehicle, wherein the image of the surrounding area outside the vehicle includes at least one image-absent portion adjacent to the vehicle, the image processor further performing combination processing for fitting an actual image of part of the vehicle captured by at least one of the cameras into at least part of a border portion between the image of the surrounding area outside the vehicle and the image of the vehicle, wherein the border portion contains the at least one image-absent portion; and
    a display device for displaying a combined image generated by the image processor.

2. The vehicle-mounted image capturing apparatus according to claim 1, wherein the image processor performs combination processing for combining an illustration border line indicating a contour of the vehicle with the combined image, and the display device displays both the illustration border line and the actual image of the part of the vehicle, with the actual image being fitted into the image-absent portion.

3. The vehicle-mounted image capturing apparatus according to claim 2, wherein the actual image of the part of the vehicle fitted into the image-absent portion comprises at least one of an actual image of a front end portion of the vehicle and an actual image of a rear end portion of the vehicle, and the illustration border line indicates a right-side and a left-side of the vehicle.

4. The vehicle-mounted image capturing apparatus according to claim 1, wherein the image processor performs combination processing for combining an illustration image of the vehicle with the combined image, and the display device displays both the vehicle illustration image and the actual image of the part of the vehicle, with the actual image being fitted into the image-absent portion.

5. The vehicle-mounted image capturing apparatus according to claim 4, wherein the actual image of the part of the vehicle fitted into the image-absent portion comprises at least one of an actual image of a front end portion of the vehicle and an actual image of a rear end portion of the vehicle, and the display device displays the at least one of the front end portion and the rear end portion of the vehicle and displays a left-side and a right-side of the vehicle illustration image.

6. The vehicle-mounted image capturing apparatus according to claim 4, wherein a vehicle color in the vehicle illustration image and the actual image of the part of the vehicle fitted into the image absent portion have the same hue or hues similar to each other.

7. The vehicle-mounted image capturing apparatus according to claim 1, wherein the cameras further comprise other cameras that are configured for capturing images of border portions between the vehicle and surrounding areas outside the vehicle, and the display device displays both the actual images of the border portions captured by the other cameras, and the actual image of the part of the vehicle fitted into at least one image-absent portion.

8. The vehicle-mounted image capturing apparatus according to claim 7, wherein the display device displays an entire perimeter of the vehicle by using the actual images of the border portions captured by the other cameras and the actual image of the part of the vehicle fitted into at least one image-absent portion.

9. The vehicle-mounted image capturing apparatus according to claim 7, wherein the actual images of the border portions captured by the other cameras show a left-side and a right-side of the vehicle, and the actual image of the part of the vehicle fitted into at least one image-absent portion represents an actual image of a front end portion of the vehicle and an actual image of a rear end portion of the vehicle.

10. The vehicle-mounted image capturing apparatus according to claim 9, wherein the actual images of the border portions captured by the other cameras comprise images of the front wheels, and the display device is configured for displaying a steering direction of the front wheels.

11. A vehicle-mounted image capturing apparatus comprising:
   cameras provided at multiple locations on a vehicle, each camera being directed to capture an image in a range of an area away from the vehicle to part of the vehicle and being provided with a lens configured for focusing light of an image of a wide-angle space area and a photodetector device for detecting the light focused by the lens;
   an image processor performing combination processing for combining the images captured by the respective cameras into an image of a surrounding area outside the vehicle and for combining an illustration image of the vehicle with the image of the surrounding area outside the vehicle, and performing combination processing for fitting an actual image of part of the vehicle captured by at least one of the cameras into at least part of a border portion between the image of the surrounding area outside the vehicle and the illustration image of the vehicle; and
   a display device for displaying a combined image generated by the image processor.

12. The vehicle-mounted image capturing apparatus according to claim 11, wherein the actual image of the part of the vehicle comprises at least one of a front end portion and a rear end portion of the vehicle.

13. The vehicle-mounted image capturing apparatus according to claim 11, wherein the actual image of the part of the vehicle comprises at least one of a right-side and a left-side of the vehicle.

14. The vehicle-mounted image capturing apparatus according to claim 13, wherein the actual image of the part of the vehicle comprises an image of a front wheel, and the display device is configured for displaying a steering direction of the front wheel.

15. The vehicle-mounted image capturing apparatus according to claim 11, wherein a vehicle color in the illustration image of the vehicle and the actual image of the part of the vehicle have the same hue or hues similar to each other.

16. A method of operating a vehicle-mounted image capturing apparatus comprising cameras provided at multiple locations on a vehicle, each camera being directed to capture an image in a range of an area away from the vehicle to part of the vehicle and being provided with a lens that is configured for focusing light of an image of a wide-angle space area and a photodetector device for detecting the light focused by the lens, the method comprising;
   combining the images captured by the respective cameras into an image of a surrounding area outside the vehicle;
   combining an illustration image of the vehicle with the image of the surrounding area outside the vehicle;
   fitting an actual image of part of the vehicle captured by at least one of the cameras into at least part of a border portion between the image of the surrounding area outside the vehicle and the illustration image of the vehicle; and
   displaying the resulting image.

17. The method according to claim 16, wherein the actual image of the part of the vehicle comprises at least one of a front end portion and a rear end portion of the vehicle.

18. The method according to claim 16, wherein the actual image of the part of the vehicle comprises at least one of a right-side and a left-side of the vehicle.

19. The method according to claim 18, wherein the actual image of the part of the vehicle comprises an image of a front wheel, and the method further comprises displaying a steering direction of the front wheel.

20. The method according to claim 16, wherein a vehicle color in the illustration image of the vehicle and the actual image of the part of the vehicle have the same hue or hues similar to each other.

* * * * *